United States Patent Office 3,463,755
Patented Aug. 26, 1969

3,463,755
BLACK MASTERBATCHING BUTYL RUBBER
Robert A. Forrester, Houston, and Kerwyn L. Pietsch, Baytown, Tex., assignors, by mesne assignments, to Ashland Oil & Refining Company, Ashland, Ky., a corporation of Kentucky
No Drawing. Filed Dec. 31, 1962, Ser. No. 248,239
Int. Cl. C08f 45/06
U.S. Cl. 260—41.5                    1 Claim This invention relates to butyl rubber. More particularly it relates to the incorporation of pigments in butyl rubber. Still more particularly, it relates to an improved method of wet masterbatching carbon black and butyl rubber.

In the manufacture of rubber goods from rubber and synthetic rubber-like polymers, effective processing, i.e., milling, calendering, extrusion, fabrication and the like, necessarily requires that the rubber or rubber-like polymer be first broken down or plasticized. This plasticizing is commonly effected by masticating the rubber in a Banbury mixer, on an open roll mill or by the use of other suitable rubber masticating equipment. During mastication, it is also the practice to incorporate in the rubber various compounding ingredients including pigments and filler, such as carbon black.

In the case of natural rubber, and styrene-butadiene synthetic rubber as well, incorporation of carbon black during mastication is readily accomplished. This is because the rubber is tough enough prior to mastication to offer a resistance sufficient to produce the necessary shearing action to result in an excellent dispersion of the black. At the same time, the rubber breakdown is such as to produce a milled stock sufficiently soft for ready processing. However, successful incorporation of carbon black in butyl rubber by similar dry milling is hindered by the fact that butyl rubber, having a low unsaturated content, does not break down readily. Thus, if butyl rubber initially tough enough to provide the necessary shearing action for incorporation of carbon black is dry milled, the result will be a stock in which the carbon black is well dispersed but which is not easily processed. On the other hand, if the butyl rubber is initially soft enough to render it processable after dry milling, the carbon black will be inadequately dispersed because the rubber is not tough enough to provide the shearing action necessary for good mixing.

Heretofore, this problem has been met in either of two ways. The first of these is to subject a tough butyl rubber to milling on standard equipment for a period long enough to produce a processable stock having a well dispersed carbon black content. The obvious drawback to this procedure is the increased demands on equipment and manpower necessitated by the excessive energy required to produce these results. The second method is to employ a rubber not so tough as to demand such excessive energy requirements, yet which is sufficiently tough so that milling results in an acceptable, although not excellent, carbon black dispersion. Such a compromise, however, results in vulcanized products having correspondingly poorer physical properties. Particularly is this true in roadwear performance of pneumatic tires having treads made from such stocks.

More recently, it has been proposed to incorporate carbon black in butyl rubber by a wet masterbatch process. In general, this process involves the thorough dispersion of a normally liquid hydrocarbon slurry of carbon black in a separate solution of the polymer in the same hydrocarbon liquid, followed by removal of the hydrocarbon liquid. The resultant dry, solid black-rubber mix or masterbatch thus obtained not only has a uniformly dispersed carbon black content but is sufficiently soft to permit ready processing in conventional processing equipment. Although this process overcomes the many disadvantages attendant to dry mixing, nevertheless, it, too, is subject to certain disadvantages. In this respect, its primary drawback involves the fact that current commercial facilities for masterbatching synthetic rubbers are not suitably equipped for preparing a hexane slurry of carbon black.

There has continued to remain, therefore, a demand for a satisfactory process not subject to the various above described disadvantages for dispersing particulate solid pigments in butyl rubber. It is a principal object of this invention to provide such a process. It is a further object of this invention to provide a well dispersed carbon black-bearing butyl rubber stock readily processable on conventional rubber processing equipment. A still further object of this invention is to provide a process for producing a butyl rubber-carbon black masterbatch which may be subsequently diluted to a preselected carbon black/rubber ratio by dry blending with substantially carbon black-free butyl rubber. Another object is to overcome the disadvantages inherent in the above described single liquid phase hydrocarbon solvent wet masterbatching process.

In accordance with this invention, these objects have been met by a two liquid phase wet masterbatching process which constitutes a surprising simplification of the above described single liquid phase wet masterbatching process. In general, the instant process is similar to the latter process to the extent that the solution of the polymer is made in an organic solvent. At this point, however, the two processes diverge widely. Rather than adding an organic solvent slurry of carbon black to the polymer solution, an aqueous carbon black slurry is employed. The resultant two liquid phase system is subjected to agitation, preferably involving a high shearing action, whereby a surprising and unexpected migration of the carbon black to the butyl rubber occurs. On standing, a substantially clear aqueous phase is formed which can be readily decanted permitting removal of the hydrocarbon solvent from the remaining phase to give a solid carbon black-rubber mix or masterbatch. This masterbatch has a uniformly dispersed carbon black content and can be readily processed in conventional processing equipment.

By "butyl" rubber as used herein is meant any of those synthetic rubber-like polymers which are copolymerization products of a major proportion of an isoolefin and minor proportion of a diolefin. In general, such polymers are formed by a low temperature polymerization, as disclosed in more detail in U.S. Patents Nos. 2,356,128, 2,356,129 and 2,356,130, of about 80–99.5% of an isoolefin having 4 to 7 carbon atoms and about 20–0.5% of an open chain conjugated diolefin having 4–8 carbon atoms. Representative of the isoolefins intended to be included herein are isobutylene, 3-methyl butene-1, 4-methyl pentene-1 and the like, which are copolymerized with an open chain conjugated diolefin such as isoprene, butadiene-1,3, piperylene and the like. The best known example of such polymers is the copolymerization product of isobutylene with from about 1–10%, usually about 1–3%, of isoprene. While the invention is applicable to any of the above copolymerization products as well as the halo-substituted derivatives thereof, it is primarily concerned with the isobutylene-isoprene copolymers.

Not only is the process of this invention applicable in use with the various copolymerization products usually included within the term butyl rubber, but any of the recognized grades of carbon blacks may also be employed therein. Any carbon black, therefore, whether manufactured by the channel, thermal or furnace process may be used in combination with any butyl rubber to produce, by means of the present process, a readily processable, well-dispersed carbon black-butyl rubber mixture. Although the invention is applicable to any carbon black, it is primarily concerned with the reinforcing furnace blacks, e.g., High Abrasion Furnace Black (HAF), Intermediate Super Abrasion Furnace Black (ISAF) and Super Abrasion Furnace Black (SAF). Also of particular concern herein are any of those carbon blacks falling within the fineness range of reinforcing furnace blacks but which, by one means or another, have been caused to have higher, or lower, structure values than those of normal or standard reinforcing furnace blacks. By "structure" as employed herein is meant the degree of that phenomenon to which carbon black particles are associated or clustered together to form chainlike or rodlike units of varying lengths and geometric configurations. The property of modulus of a carbon black-bearing rubber stock is directly related to the structure value of the carbon black. Structure is measured in terms of the amount of a standard linseed oil absorbed by a fixed quantity of carbon black prior to reaching an established end point. A preferred embodiment of this invention, therefore, involves the use of isobutylene-isoprene copolymers and high abrasion furnace blacks of varying structure values.

Carbon black is available commercially in either pelleted or unpelleted form. Usually, it is in a pelleted form, prepared by various means which form no part of this invention, to facilitate handling and shipping and to lessen dusting. Either physical form of carbon black may be employed. In forming the aqueous carbon black slurry of this invention, either the dry or wet grinding method may be employed. In the dry method, the pelleted carbon black is ground dry and the comminuted product added to water with agitation. In the wet grinding method, the pelleted carbon black is suspended in water and the resulting suspension subjected to high mechanical shear. In either method, a chemical dispersing agent may be employed if desired. There are, of course, other methods which have been proposed for forming carbon black slurries any of which may also be employed if desired since the particular method of forming the aqueous carbon black slurry forms no part of this invention.

The extent to which pelleted black must be reduced in size is governed by the requirement that no appreciable amount of rub-off, or crocking, of black from the resultant dry carbon black-butyl rubber mix should occur. This property of rub-off is related to the degree of dispersion of the black in the mix which in turn is related to some extent to the fineness of the black. In order to more readily obtain this desirable property, it has been found that optimum reduction of pelleted black should be to substantially 90–100% minus 325 mesh U.S. Sieve Series. So far as slurry density is concerned, it will necessarily vary according to the particular black employed and, accordingly, cannot meaningfully be described numerically. In practice, slurry densities similar to those used in wet masterbatching styrene-butadiene rubbers will be employed. The essential feature, of course, is that the slurry be flowable and sufficiently fluid to permit ready movement thereof through pumps and other conventional equipment, yet sufficiently viscous to provide, when combined with the solution of butyl rubber, sufficient shear so as to adequately disperse the black. It is also desirable, of course, to maintain the liquid phase of the slurry at as low a level as possible to reduce the extent to which it must subsequently be removed to produce the dry carbon black-butyl rubber masterbatch.

The solvent employed for forming a butyl rubber solution may be widely varied and restricted only in that it be chemically inert with respect to and otherwise compatible with the rubber. Any normally liquid aliphatic or aromatic hydrocarbon may be employed. Representative of these are the aliphatic hyddrocarbons such as pentane, hexane, heptane and the like; halogenated aliphatic hydrocarbons such as carbon tetrachloride, trichloroethylene and the like; aromatic hydrocarbons such as benzene and its homologues and their halogenated derivative, thiophene, nitrobenzene and the like. A preferred embodiment of this invention involves the use of the paraffins, particularly hexane.

Various means may be employed to prepare the butyl solution. Thus, the solution may be readily prepared merely by incorporating the dry polymer in the selected solvent with suitable agitation. A particularly desirable procedure is to use the water wet crumb obtained by processing the polymer-bearing reaction mass. Alternatively, preparation of the polymer may be so conducted that the reaction medium may subsequently serve as the solvent in the masterbatching step. In any event, the toughness of the polymer should be equivalent to a Mooney viscosity (ML–8 at 212° F.) of about 40–60 to insure adequate processing properties. The solution concentration will depend to some extent upon the particular equipment being employed. Preferably, when starting with the dry polymer or with the water wet crumb, only enough solvent is employed to swell but not completely dissolve the polymer. On the other hand, if it is desired to move the material through pumps and other conventional processing equipment, the solution concentration has to be adequately adjusted. As used throughout the specification and claims, therefore, the terms "butyl solution" or "solution" are intended to mean a combination of butyl rubber and a solvent in which solvent the butyl rubber is not necessarily completely dissolved. In any event, the concentration has to be adequate to provide adequate shearing action, once the carbon black slurry has been added, to thoroughly disperse the carbon black.

The particular manner or order in which the aqueous carbon black slurry and the solution of butyl are brought together does not appear to be critical, so that either one may be added to the other or both brought together into a common stream. The proportions of solvent and water in the two phases are such as to provide a solvent/water ratio of at least about 25/75 parts by weight. This ratio may be increased to as high as 75/25 and even higher but usually will be in the range of about 50/50–75/25 parts by weight. The concentrations of each liquid phase can be so controlled, in the light of the liquid phase ratio, to produce the ratio of black/rubber desired in the final black rubber mix. Usually, the ratio of black/rubber in a cured rubber composition will be about 40–60/100 parts by weight, which can be readily obtained by the process of this invention. It may be desired, however, in order to facilitate shipping as well as to permit the consumer to establish his own black level, to produce a high ratio black-rubber masterbatch which the consumer may subsequently dilute with straight butyl rubber. In this event, it is possible to produce a masterbatch in which the black/rubber ratio is as high as 200/100 parts by weight with the masterbatch exhibiting substantially no black rub-off or crocking. Such a high ratio black/rubber masterbatch, particularly one exhibiting such as excellent property of rub-off, has heretofore not been successfully obtainable by dry mixing.

As in the preparation of the slurry and solution components, the time necessary to produce a dispersion from which a product having substantially no rub-off can be obtained is dependent on numerous variables such as grade of black, solvent, particle size, consistency of the mix, as well as the dispersing means employed and its manner of use. Once a thorough dispersion is obtained, the mixture is permitted to stratify into a carbon black-butyl rubber-solvent phase and a water phase. The totally unexpected migration of the carbon black to the butyl rubber is evidenced by the substantially complete absence of carbon black in the water phase. The water phase can then be decanted and the solvent and any remaining water driven off to obtain a dry carbon black-butyl rubber masterbatch, the particular means for conducting the several unit operations forming no part of this invention.

The process of this invention is particularly advantageous in that it permits starting out with a butyl rubber whose Mooney viscosity value is sufficiently low, i.e., ML–8 at 212° F. of about 40–60, to render the resultant masterbatch processable, while at the same time it produces a masterbatch through which the carbon black is thoroughly dispersed, as evidenced by its non-cracking property. It has the further advantage that, not only can masterbatches of 150–200/100 parts by weight of black/rubber be prepared, but these masterbatches can be quite simply and readily diluted with straight butyl on conventional rubber mixing equipment to lower ratios, e.g., 40–60/100 by weight, while retaining the same excellent processability. More surprising, however, is that pneumatic tires having treads prepared from such diluted masterbatches exhibit superior treadwear properties as compared to black-butyl stocks prepared by dry mixing at the diluted ratio under optimum mixing conditions.

Although the process of this invention has been particularly described with respect to incorporating carbon black in butyl rubber, other pigments and other solid and/or liquid compounding ingredients can be incorporated therein. Particularly, it should be noted that any of the well known processing oils may be incorporated, preferably along with the carbon black when formed into its slurry, to provide for the formation of an oil-extended butyl masterbatch. By the instant process, as high as 25% oil by weight of the polymer can be incorporated in the polymer, thereby effecting a considerable economy. As employed herein, the term "processing oil" is intended to mean those physical rubber softeners, as contrasted to chemically active plasticizers or peptizers, which the art regularly uses for oil extension in the technique of styrene-butadiene latex masterbatching. A wide variety of physical softeners are commercially available to the rubber trade, many of which are of a proprietary nature whose compositions are sometimes not clearly specified. Such physical softeners, however can be helpfully classified according to their sources. Thus, physical softeners may broadly be classified as petroleum derivatives such as naphthenic, aromatic and highly aromatic oils, resins, waxes, asphalts and the like; pine tree derivatives such as pine tar, pitch, resins and the like, and natural fats and oils such as vegetable oils, fatty acids and the like; as well as various synthetic organic compounds. These classes of softeners are well known in the art and certain softeners in certain classes have received wide commercial acceptance. Among those widely employed for extending styrene-butadiene rubbers are the "naphthenic," "aromatic" and "highly aromatic oils" comprising predominately the high resinous portions of high boiling petroleum distillates. A fourth category is designated as "paraffinic" oils. Representative examples of commercially available materials employed by the rubber trade as physical softeners for rubber extension may be found in U.S. Patent No. 2,964,083. Any of these rubber extenders may be employed in accordance with the process of this invention so as to provide a butyl composition containing from about 10–25% by weight of the butyl content.

The following examples further illustrate the invention. All parts are by weight unless otherwise noted.

EXAMPLE 1

40 parts of pelleted Super Abrasion Furnace (SAF) carbon black are comminuted to 90–100% minus 325 mesh U.S. Sieve Series and slurried with 250 parts of water by vigorously agitating for a period of 10 minutes. To 400 parts of hexane is added 100 parts of butyl rubber comprising a copolymerization product of isobutylene and isoprene having a Mooney viscosity (ML–8 at 212° F.) of about 50, the resultant mixture being vigorously agitated. The aqueous slurry and butyl solutions are brought together, vigorously agitated for 15 minutes and the resultant two phase liquid masterbatch permitted to separate into two layers. The resultant carbon black-free water layer is decanted and the remaining layer treated to remove solvent and any residual water to give a dry, flaky carbon black-butyl rubber masterbatch. The dispersion of carbon black in the rubber is excellent as evidenced by the substantially complete absence of carbon black rub-off.

EXAMPLE 2

The procedure of Example 1 is repeated except that 200 parts of carbon black are slurried in 1250 parts of water and 100 parts of the butyl rubber are put into solution in 400 parts of hexane. After mixing the slurry and solution together with vigorous agitation, the resultant liquid masterbatch is treated as in Example 1 to remove water and solvent. A dry, flaky, well dispersed carbon black-butyl rubber masterbatch is obtained containing 200 parts of carbon black per 100 parts of butyl rubber and exhibiting negligible carbon black rub-off.

EXAMPLE 3

The procedure of Example 1 is repeated except that the carbon black pellets are first slurried in water and the resultant slurry subjected to vigorous agitation for a sufficient time to reduce the pellets to substantially 90–100% minus 325 mesh U.S. Sieve Series and to thoroughly disperse the comminuted black throughout the slurry medium. On vigorously agitating the resultant slurry together with the butyl solution followed by drying, a carbon black-butyl rubber masterbatch having similar properties is obtained.

EXAMPLE 4

The procedure of Example 1 is repeated except that 100 parts of butyl rubber crumb are added to sufficient hexane to swell the rubber but not completely dissolve it. The ratio of water/solvent in the two phase system is about 75/25. On following the remaining steps of the procedure of Example 1, a masterbatch of like qualities is obtained.

EXAMPLE 5

The procedure of Examples 1 and 2 are repeated except that the SAF carbon black of Example 1 is replaced with a like quantity of Intermediate Super Abrasion Furnace (ISAF) carbon black, and the SAF carbon black of Example 2 is replaced by High Abrasion Furnace (HAF) carbon black. In both instances, similar results are obtained as in Examples 1 and 2.

EXAMPLE 6

The procedure of Example 1 is repeated except that hexane is replaced as the solution medium by each of pentane, benzene and toluene. In each instance, a masterbatch having similar properties is obtained.

EXAMPLE 7

The procedure of Example 1 is repeated with similar results employing butyl rubbers comprising other copolymerization products of isoolefins and open chain conjugated diolefins.

EXAMPLE 8

The procedure of Example 1 is repeated except that 10 parts of Sundex 53 (a dark aromatic and naphthenic blend lubricating oil extract consisting of approximately 75% aromatic hydrocarbons and 25% naphthenic hydrocarbons) are added to the carbon black slurry to produce a final oil-extended black masterbatch containing 40/100 parts by weight of carbon black/butyl rubber and 10/100 parts by weight extender oil of butyl rubber.

We claim:
1. A method of preparing a readily-processable mixture of carbon black and a synthetic rubber-like polymer which is a copolymerization product of a major proportion of isobutylene and a minor proportion of isoprene which comprises: preparing the polymer in the form of a water-bearing crumb; mixing the water-bearing crumb with an organic rubber solvent characterized by the property of forming a separate phase when mixed with water and allowed to stand; limiting the organic rubber solvent added to said water-bearing crumb to an amount which is able to swell but not completely dissolve the polymer; mixing the mixture of water-bearing crumb and rubber solvent with an aqueous carbon black slurry in sufficient amount to provide in the resultant mixture a solvent-to-water ratio in the range of about 50/50 to about 75/25 by weight; permitting the last-mentioned mixture to stratify into a carbon black and polymer-bearing organic solvent phase and a substantially clear aqueous phase; separating the phases; and treating the solvent phase to obtain a dry, homogeneous carbon black-polymer mixture.

References Cited

UNITED STATES PATENTS 2,986,547  5/1961  Jefts _____ 260—41

FOREIGN PATENTS 158,769  9/1954  Australia.

ALLAN LIEBERMAN, Primary Examiner